United States Patent
Chang

(10) Patent No.: US 10,053,071 B2
(45) Date of Patent: Aug. 21, 2018

(54) LANE KEEPING CONTROL METHOD FOR VEHICLE

(71) Applicant: Hyundai Motor Company, Seoul (KR)

(72) Inventor: Il Young Chang, Seoul (KR)

(73) Assignee: Hyundai Motor Company, Seoul (KR)

( * ) Notice: Subject to any disclaimer, the term of this patent is extended or adjusted under 35 U.S.C. 154(b) by 115 days.

(21) Appl. No.: 15/346,887

(22) Filed: Nov. 9, 2016

(65) Prior Publication Data

US 2017/0355355 A1  Dec. 14, 2017

(30) Foreign Application Priority Data

Jun. 8, 2016 (KR) .................. 10-2016-0070659

(51) Int. Cl.
| | |
|---|---|
| *G09G 5/00* | (2006.01) |
| *B60T 8/1755* | (2006.01) |
| *B60T 7/12* | (2006.01) |
| *G05D 1/02* | (2006.01) |
| *B60T 7/22* | (2006.01) |

(52) U.S. Cl.
CPC ............ *B60T 8/17557* (2013.01); *B60T 7/12* (2013.01); *B60T 7/22* (2013.01); *G05D 1/021* (2013.01); *B60T 2201/08* (2013.01); *B60T 2201/083* (2013.01); *B60T 2250/03* (2013.01); *G05D 2201/0213* (2013.01)

(58) Field of Classification Search
CPC .............. G09G 5/006; G09G 2360/04; G09G 2370/16; G09G 2380/10; G01C 21/3632; G01C 21/3667; H04W 4/02; H04W 4/046; H04W 4/027; H04W 4/06; H04W 88/02

See application file for complete search history.

(56) References Cited

U.S. PATENT DOCUMENTS

| | | | | |
|---|---|---|---|---|
| 4,930,083 A | * | 5/1990 | Hoashi | B60T 8/72 180/197 |
| 6,556,909 B2 | * | 4/2003 | Matsumoto | B60K 23/0808 180/204 |
| 9,261,601 B2 | * | 2/2016 | Ibrahim | G01S 19/39 |

(Continued)

FOREIGN PATENT DOCUMENTS

| | | |
|---|---|---|
| JP | 2001-301640 | 10/2001 |
| JP | 2000-335393 | 12/2005 |

(Continued)

OTHER PUBLICATIONS

KR20140050395A english machine translation, Google Patents website, all pages, retrieved from https://patents.google.com/patent/KR20140050395A/en?oq=KR20140050395A.*

*Primary Examiner* — Calvin Cheung
(74) *Attorney, Agent, or Firm* — Morgan, Lewis & Bockius LLP

(57) ABSTRACT

A lane keeping control method for a vehicle may include determining, by a controller, whether a wheel speed difference exists between predetermined wheels, during braking while the vehicle travels straight, determining, by the controller, a reference wheel and a control wheel, based on the wheel speed difference between the predetermined wheels, and reducing, by the controller, a wheel speed difference between the reference wheel and the control wheel by performing pre-decompression control for the control wheel, when the wheel speed difference exists.

8 Claims, 2 Drawing Sheets

(56) References Cited

U.S. PATENT DOCUMENTS

| | | | | |
|---|---|---|---|---|
| 9,463,782 B2* | 10/2016 | Kikawa | ............. | B60L 7/18 |
| 2005/0216156 A1* | 9/2005 | Asano | ............. | B62D 6/003 |
| | | | | 701/41 |
| 2009/0095551 A1* | 4/2009 | Sawada | ............. | B60T 8/1764 |
| | | | | 180/197 |
| 2013/0173115 A1* | 7/2013 | Gunia | ............. | B62D 6/00 |
| | | | | 701/41 |

FOREIGN PATENT DOCUMENTS

| | | |
|---|---|---|
| JP | 2015-112978 | 6/2015 |
| KR | 10-2011-0125282 A | 11/2011 |
| KR | 10-2011-0138060 A | 12/2011 |
| KR | 10-2013-0136079 A | 12/2013 |
| KR | 10-2014-0050395 A | 4/2014 |
| KR | 1020150081894 | 7/2015 |

* cited by examiner

LANE KEEPING CONTROL METHOD FOR VEHICLE

CROSS-REFERENCE TO RELATED APPLICATION

The present application claims priority to Korean Patent Application No. 10-2016-0070659, filed Jun. 8, 2016, the entire contents of which is incorporated herein for all purposes by this reference.

BACKGROUND OF THE INVENTION

Field of the Invention

The present invention relates to a lane keeping control method for a vehicle. More particularly, to a lane keeping control method for a vehicle capable of preventing lane departure which may occur due to yaw of a vehicle during braking while the vehicle travels straight.

Description of Related Art

Recently, the Electronic Stability Control (ESC) system which stably performs vehicle dynamic control for a vehicle has been applied as an electronic control system for improving the driving stability of the vehicle.

One of the functions of the ESC system is a Straight Lane Stability control (SLS) function. The ESC system performs the SLS function of monitoring instability of a vehicle in operation and adjusting a braking force (braking pressure) supplied to wheels, thereby improving the straight driving stability of the vehicle.

Thus, a vehicle having the ESC system mounted therein improves vehicle yaw which occurs while the vehicle leans to one side during braking, through the SLS, thereby increasing the driving stability.

In the related art, a yaw rate of a vehicle is used as an entry condition of the SLS. The SLS is started according to a detected yaw rate, and then ended when the yaw rate decreases to a reference value or less.

However, when the yaw rate of the vehicle is used, the SLS is started after yaw of the vehicle occurred. Thus, the improvement effect for the vehicle yaw during braking is inevitably lowered, and excessive braking pressure control is caused to make it difficult to secure the vehicle stability. Furthermore, a user may feel a sense of difference while operating a brake pedal.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a lane keeping control method for a vehicle, which uses a wheel speed difference between the left and right wheels at the front of a vehicle as a Straight Lane Stability (SLS) entry condition, controls braking pressure from the initial stage at which vehicle yaw starts to occur during braking, and effectively improves the vehicle yaw, thereby preventing lane departure of the vehicle and improving the straight driving stability.

According to various aspects of the present invention, a lane keeping control method for a vehicle may include determining, by a controller, whether a wheel speed difference exists between left and right wheels, during braking while the vehicle travels straight, determining, by the controller, a reference wheel and a control wheel, based on the wheel speed difference between the left and right wheels, and reducing, by the controller, a wheel speed difference between the reference wheel and the control wheel by performing pre-decompression control for the control wheel, when the wheel speed difference exists.

The lane keeping control method may further include counting, by a controller, a wheel speed stabilization time according to the pre-decompression control for the control wheel, and determining whether to end the pre-decompression control for the control wheel according to the wheel speed stabilization time.

In the determining a reference wheel and a control wheel, a wheel having a lower wheel speed between the left and right wheels may be determined as the control wheel which requires decompression control, and a remaining wheel between the left and right wheels having a higher wheel speed may be determined as the reference wheel.

The counting may include counting the wheel speed stabilization time when the wheel speed difference between the control wheel and the reference wheel becomes less than a wheel speed difference tolerance, and determining to end the pre-decompression control for the control wheel, when the wheel speed stabilization time exceeds a predetermined time.

The lane keeping control method may further include a subsequent decompression control, by the controller, of performing subsequent decompression control for the control wheel, when the wheel speed difference between the reference wheel and the control wheel according to the pre-compression control of the third step exceeds a wheel speed difference tolerance.

In the subsequent decompression control, the subsequent decompression control for the control wheel may be performed until the wheel speed difference between the control wheel and the reference wheel becomes less than the wheel speed difference tolerance.

The lane keeping control method may further include end determination, by the controller, of counting a wheel speed stabilization time according to the subsequent decompression control for the control wheel, and determining whether to end the subsequent decompression control for the control wheel according to the wheel speed stabilization time.

The end determination may include counting the wheel speed stabilization time when the wheel speed difference between the control wheel and the reference wheel becomes less than the wheel speed difference tolerance, and determining to end the subsequent decompression control for the control wheel when the wheel speed stabilization time exceeds a predetermined time.

According to various embodiments of the present invention, the lane keeping control method for a vehicle can effectively improve vehicle yaw by controlling braking pressure from the initial stage at which the vehicle yaw starts to occur during braking, thereby preventing lane departure of the vehicle which may occur due to the vehicle yaw during braking and improving the straight driving stability. Further, the lane keeping control method can perform appropriate braking pressure control for the SLS control, thereby preventing a user from feeling a sense of difference due to excessive braking pressure control while operating a brake pedal, and improving marketability.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In various embodiments of the present invention, a wheel speed difference between the left and right wheels at the front of a vehicle is used as a Straight Lane Stability (SLS) entry condition. From the initial stage at which vehicle yaw starts to occur during braking, braking pressure (liquid pressure for wheel braking) is reduced to effectively improve the vehicle yaw. Therefore, lane departure of the vehicle can be prevented, and the straight driving stability of the vehicle can be improved.

Figure 1:
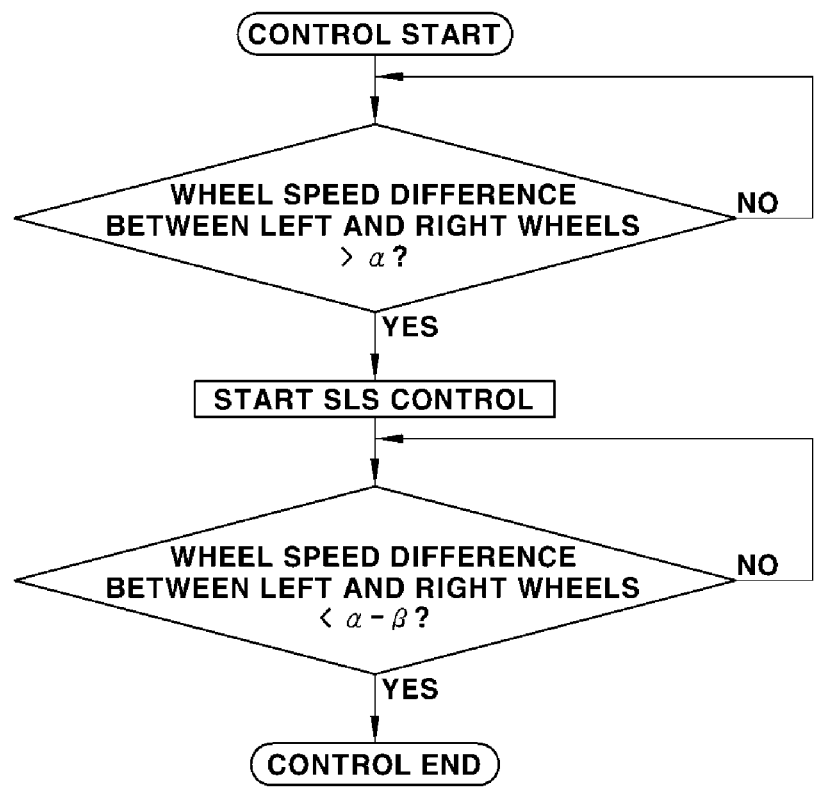
FIG. 1 is a schematic flowchart illustrating a lane keeping control method for a vehicle according to various embodiments of the present invention.

For this operation, when the wheel speed difference between the left and right wheels exceeds a reference value a as illustrated in FIG. 1, the SLS is started to reduce braking pressure supplied to a selected wheel. When the wheel speed difference between the left and right wheels is decreased through the reduction of the braking pressure and satisfies "wheel speed difference between the left and right wheels< $(\alpha-\beta)$," the SLS is ended.

The reference value a is a value which is tuned to the optimal value according to a vehicle, and β represents a decrease of the reference value a which can be tuned according to a vehicle.

Figure 2:
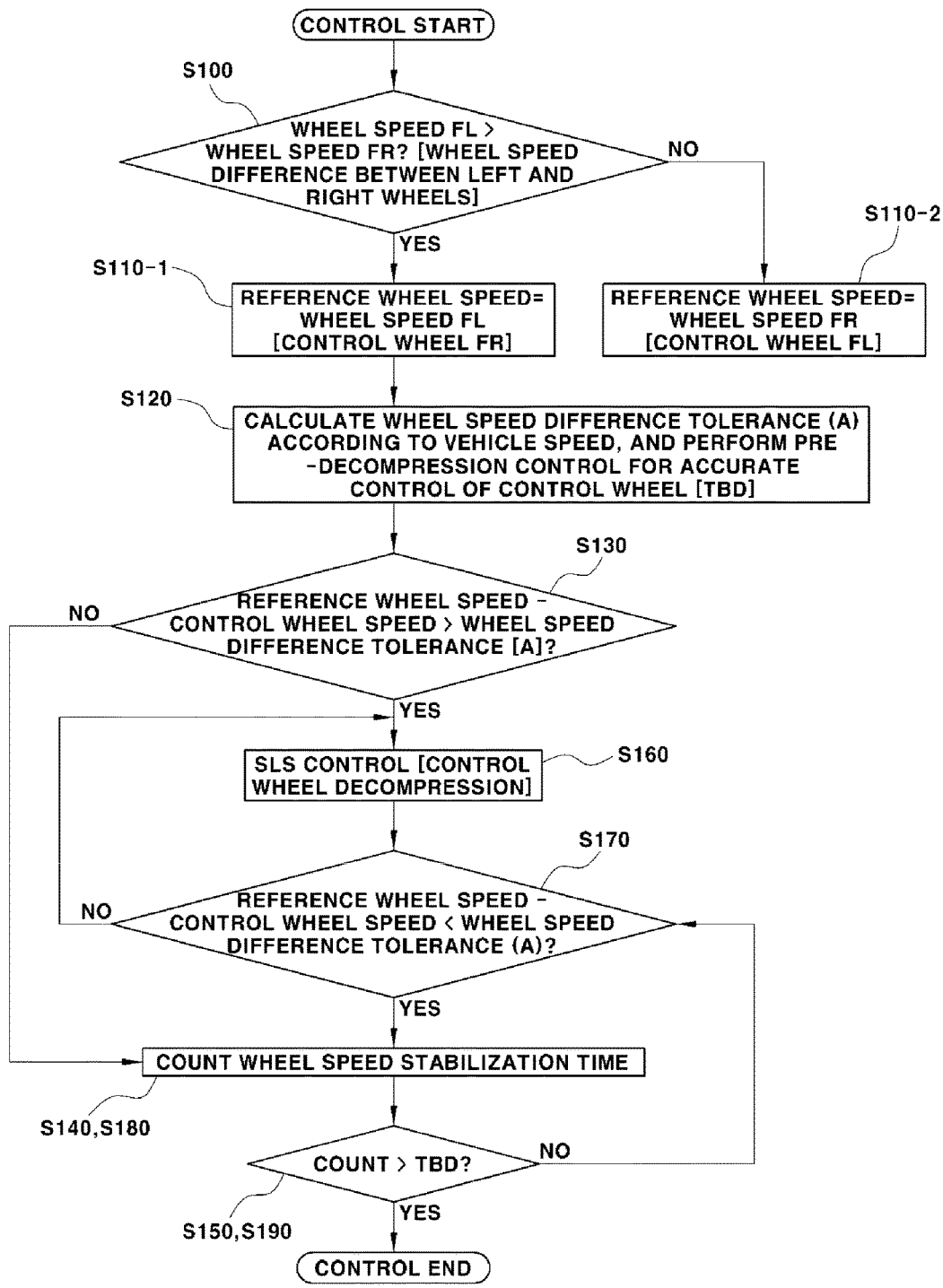
FIG. 2 is a flowchart sequentially illustrating the lane keeping control method for a vehicle according to various embodiments of the present invention.

Referring to FIG. 2, a lane keeping control method for a vehicle according to various embodiments of the present invention will be described in detail. The various steps of the lane keeping control method for a vehicle according to various embodiments of the present invention may be performed by a controller, e.g., and electronic control unit (ECU) of the vehicle which is known to one skilled in the art, therefore a detailed description thereof is omitted. As illustrated in FIG. 2, the lane keeping control method first compares the wheel speeds of the left and right wheels at the front of a vehicle during braking while the vehicle travels straight, and determines whether a wheel speed difference exists between the left and right wheels (S100). Based on the wheel speed difference, the lane keeping control method determines a reference wheel and a control wheel.

When a wheel speed difference exists between the left and right wheels, a wheel of which the wheel speed is lower between the left and right wheels is determined as the control wheel which requires decompression control for yaw improvement, and the other wheel of which the wheel speed is higher is determined as the reference wheel. Then, the lane keeping control method performs pre-decompression control for accurately controlling pressure of the control wheel.

For example, when the wheel speed of the left wheel is higher than the wheel speed of the right wheel, the right wheel is determined as the control wheel, the left wheel is determined as the reference wheel, and the wheel speed of the left wheel is determined as the reference wheel speed (S110-1). On the other hand, when the wheel speed of the right wheel is higher than the wheel speed of the left wheel, the left wheel is determined as the control wheel, the right wheel is determined as the reference wheel, and the wheel speed of the right wheel is determined as the reference wheel speed (S110-2).

More specifically, when a wheel speed difference occurs between the left and right wheels during braking, the lane keeping control method reduces the wheel speed difference between the control wheel and the reference wheel by performing pre-decompression control for the control wheel having a lower wheel speed for a predetermined time TBD, before determining whether the wheel speed difference exceeds a wheel speed difference tolerance A (S120).

As such, the lane keeping control method can previously stabilize the behavior of the vehicle by reducing the wheel speed difference through the pre-decompression control for the control wheel. As the vehicle behavior is previously stabilized to improve responsiveness, the lane keeping control method can suppress vehicle yaw during braking, or improve vehicle yaw from an initial point of time that the vehicle yaw starts to occur.

Then, the lane keeping control method calculates the wheel speed difference tolerance A according to the vehicle speed. In other words, the lane keeping control method calculates the wheel speed difference tolerance A as the maximum value of the wheel speed difference, at which the occurrence of vehicle yaw is not concerned, based on the speed of the vehicle in operation (S120), and compares the wheel speed difference between the reference wheel and the control wheel to the wheel speed difference tolerance A (S130).

As the comparison result, when the wheel speed difference between the reference wheel and the control wheel is equal to or less than the wheel speed difference tolerance A, it may indicate that there is no possibility that vehicle yaw will occur. Therefore, the lane keeping control method ends the decompression control for the control wheel without performing subsequent decompression control for the control wheel through the SLS. At this time, in order to determine whether the wheel speed is stabilized through the pre-decompression control for the control wheel, the lane keeping control method determines whether the wheel speed difference is maintained to be less than the wheel speed difference tolerance A for the predetermined time TBD.

More specifically, in order to determine whether to end the decompression control for the control wheel without performing the subsequence decompression control after the pre-decompression control for the control wheel, the lane keeping control method counts a wheel speed stabilization time according to the pre-decompression control for the control wheel (S140). The lane keeping control method counts the time during which the wheel speed difference is maintained to be less than the wheel speed difference tolerance A, that is, the wheel speed stabilization time, and determines whether the counted value exceeds the predetermined time TBD (S150). When the counted value exceeds the predetermined time TBD, the lane keeping control method considers that there is no wheel speed difference which causes vehicle yaw or considers that the wheel speed difference between the left and right wheels is stabilized, and then ends the decompression control for the control wheel.

On the other hand, when the wheel difference speed between the reference wheel and the control wheel exceeds the wheel speed difference tolerance A, the lane keeping control method determines that vehicle yaw occurs or determines that vehicle yaw occurs even after the pre-decompression control for the control wheel, and performs the subsequent decompression control for the control wheel through the SLS (S160).

At this time, the subsequent decompression control is performed until the wheel speed difference between the reference wheel and the control wheel becomes less than the wheel speed difference tolerance A. That is, the lane keeping control method compares the wheel speed difference to the wheel speed difference tolerance A (S170). When the wheel speed difference becomes less than the wheel speed difference tolerance A, the lane keeping control method determines whether the wheel speed difference is maintained to be less than the wheel speed difference tolerance A for the predetermined time TBD, in order to determine whether the wheel speed is stabilized through the subsequent decompression control for the control wheel.

For this operation, the lane keeping control method counts the wheel speed stabilization time during which the wheel speed difference between the left and right wheels is maintained to be less than the wheel speed difference tolerance A through the subsequent decompression control (S180), and determines whether the counted value exceeds the predetermined time TBD (S190), as in the pre-decompression control. When the counted value exceeds the predetermined time TBD, the lane keeping control method determines that the wheel speed difference causing the vehicle yaw was removed, and ends the subsequent decompression control for the control wheel.

When the wheel speed stabilization time does not exceed the predetermined time TBD, the lane keeping control method determines that the wheel speed difference is increasing, and performs additional decompression control for the control wheel.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A lane keeping control method for a vehicle, comprising:
    determining, by a controller, whether a wheel speed difference exists between predetermined wheels, during braking while the vehicle travels straight;
    determining, by the controller, a reference wheel and a control wheel, based on the wheel speed difference between the predetermined wheels; and
    reducing, by the controller, a wheel speed difference between the reference wheel and the control wheel by performing pre-decompression control for the control wheel, when the wheel speed difference exists.

2. The lane keeping control method of claim 1, further comprising:
    counting, by the controller, a wheel speed stabilization time according to the pre-decompression control for the control wheel, and determining whether to end the pre-decompression control for the control wheel according to the wheel speed stabilization time.

3. The lane keeping control method of claim 1, wherein in the determining the reference wheel and the control wheel, a wheel having a lower wheel speed between the predetermined wheels is determined as the control wheel which requires decompression control, and a remaining wheel between the predetermined wheels having a higher wheel speed is determined as the reference wheel.

4. The lane keeping control method of claim 2, wherein the counting of the wheel speed stabilization time comprises:
    counting the wheel speed stabilization time when the wheel speed difference between the control wheel and the reference wheel becomes less than a wheel speed difference tolerance; and
    determining to end the pre-decompression control for the control wheel, when the wheel speed stabilization time exceeds a predetermined time.

5. The lane keeping control method of claim 1, further comprising:
    a subsequent decompression control, by the controller, of performing subsequent decompression control for the control wheel, when the wheel speed difference between the reference wheel and the control wheel according to the pre-compression control of the third step exceeds a wheel speed difference tolerance.

6. The lane keeping control method of claim 5, wherein in the subsequent decompression control, the subsequent decompression control for the control wheel is performed until the wheel speed difference between the control wheel and the reference wheel becomes less than the wheel speed difference tolerance.

7. The lane keeping control method of claim 5, further comprising:
   end determination step, by the controller, of counting a wheel speed stabilization time according to the subsequent decompression control for the control wheel, and determining whether to end the subsequent decompression control for the control wheel according to the wheel speed stabilization time.

8. The lane keeping control method of claim 7, wherein the end determination step comprises:
   counting the wheel speed stabilization time when the wheel speed difference between the control wheel and the reference wheel becomes less than the wheel speed difference tolerance; and
   determining to end the subsequent decompression control for the control wheel when the wheel speed stabilization time exceeds a predetermined time.

* * * * *